(12) United States Patent
Lee et al.

(10) Patent No.: US 10,728,869 B2
(45) Date of Patent: Jul. 28, 2020

(54) SIGNAL TRANSMISSION METHOD FOR ESTIMATING PHASE NOISE IN WIRELESS COMMUNICATION SYSTEM

(71) Applicant: LG ELECTRONICS INC., Seoul (KR)

(72) Inventors: Kilbom Lee, Seoul (KR); Kyuseok Kim, Seoul (KR); Kijun Kim, Seoul (KR); Minki Ahn, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/308,402

(22) PCT Filed: Mar. 22, 2017

(86) PCT No.: PCT/KR2017/003046
§ 371 (c)(1),
(2) Date: Dec. 7, 2018

(87) PCT Pub. No.: WO2017/213334
PCT Pub. Date: Dec. 14, 2017

(65) Prior Publication Data
US 2019/0141653 A1    May 9, 2019

Related U.S. Application Data

(60) Provisional application No. 62/347,624, filed on Jun. 9, 2016.

(51) Int. Cl.
*H04B 17/336* (2015.01)
*H04W 56/00* (2009.01)
(Continued)

(52) U.S. Cl.
CPC ....... *H04W 56/0035* (2013.01); *H04L 1/0003* (2013.01); *H04L 5/0048* (2013.01);
(Continued)

(58) Field of Classification Search
None
See application file for complete search history.

(56) References Cited

U.S. PATENT DOCUMENTS 9,444,594 B2 *  9/2016  Sun ................... H04B 10/27
9,749,056 B2 *  8/2017  Li ..................... H04L 27/2601
(Continued)

FOREIGN PATENT DOCUMENTS

EP    1641206 A2 *  3/2006  .......... H04L 27/261
WO   2016048074      3/2016

OTHER PUBLICATIONS

PCT International Application No. PCT/KR2017/003046, Written Opinion of the International Searching Authority dated May 24, 2017, 15 pages.

*Primary Examiner* — Sithu Ko
(74) *Attorney, Agent, or Firm* — Lee Hong Degerman Kang Waimey

(57) ABSTRACT

Disclosed are a signal transmission method and a base station the signal transmission method comprising: generating a phase data signal used for estimating phase noise in a downlink signal; and mapping the phase data signal on part of a resource region to which a general data signal to be transmitted to a terminal is mapped, and transmitting the general signal and phase data signal to the terminal, wherein the modulation order of the phase data signal is the same or lower than the modulation order of the general data signal.

10 Claims, 8 Drawing Sheets

(a)

(b)

(51) Int. Cl.
*H04L 5/00* (2006.01)
*H04L 27/00* (2006.01)
*H04W 76/27* (2018.01)
*H04L 1/00* (2006.01)
*H04W 72/04* (2009.01)
*H04W 74/08* (2009.01)
*H04B 7/06* (2006.01)
*H04L 27/20* (2006.01)
*H04L 27/36* (2006.01)
*H04J 13/00* (2011.01)
*H04W 80/02* (2009.01)
*H04W 84/12* (2009.01)

(52) U.S. Cl.
CPC .......... *H04L 5/0053* (2013.01); *H04L 5/0091* (2013.01); *H04L 27/0008* (2013.01); *H04L 27/0012* (2013.01); *H04L 27/0014* (2013.01); *H04W 56/004* (2013.01); *H04W 56/0025* (2013.01); *H04W 72/042* (2013.01); *H04W 74/0833* (2013.01); *H04W 76/27* (2018.02); *H04B 7/0617* (2013.01); *H04J 13/0062* (2013.01); *H04L 5/0007* (2013.01); *H04L 5/0026* (2013.01); *H04L 5/0051* (2013.01); *H04L 27/2053* (2013.01); *H04L 27/362* (2013.01); *H04W 80/02* (2013.01); *H04W 84/12* (2013.01)

(56) References Cited

U.S. PATENT DOCUMENTS

| | | | | |
|---|---|---|---|---|
| 9,806,932 | B2* | 10/2017 | Zhang | H04L 27/3488 |
| 2010/0177723 | A1* | 7/2010 | Kim | H04L 5/0048 |
| | | | | 370/329 |
| 2013/0223359 | A1* | 8/2013 | Kenney | H04L 5/005 |
| | | | | 370/329 |
| 2013/0259106 | A1 | 10/2013 | Tarighat Mehrabani | |
| 2015/0098535 | A1 | 4/2015 | Wu et al. | |
| 2016/0006594 | A1 | 1/2016 | Persson et al. | |
| 2016/0094372 | A1* | 3/2016 | Jitsukawa | H04L 27/2613 |
| | | | | 375/302 |
| 2016/0105236 | A1 | 4/2016 | Zhang et al. | |
| 2016/0127094 | A1* | 5/2016 | Jiang | H04L 5/006 |
| | | | | 370/252 |
| 2017/0280444 | A1* | 9/2017 | Da Silva | H04L 5/0048 |
| 2017/0290046 | A1* | 10/2017 | Sun | H04W 74/006 |
| 2017/0294926 | A1* | 10/2017 | Islam | H04L 5/0051 |

* cited by examiner (a)  (b)

ID

SIGNAL TRANSMISSION METHOD FOR ESTIMATING PHASE NOISE IN WIRELESS COMMUNICATION SYSTEM

CROSS-REFERENCE TO RELATED APPLICATIONS

This application is the National Stage filing under 35 U.S.C. 371 of International Application No. PCT/KR2017/003046, filed on Mar. 22, 2017, which claims the benefit of U.S. Provisional Application No. 62/347,624, filed on Jun. 9, 2016, the contents of which are all hereby incorporated by reference herein in their entirety.

TECHNICAL FIELD

Following description relates to a wireless communication system, and more particularly, to a method of transmitting a signal for estimating phase noise in a wireless LAN system and an apparatus therefor.

BACKGROUND ART

In an ultrahigh frequency wireless communication system using mmWave, a center frequency is configured to operate in several GHz to dozens of GHz. Due to the characteristic of the center frequency, a path loss may considerably occur in a radio shadow area in the mmWave communication system. Since it is necessary to stably transmit a synchronization signal to all UEs belonging to the coverage of a base station, in the mmWave communication system, it is necessary to design and transmit a synchronization signal in consideration of a potential deep-null phenomenon capable of being occurred due to the characteristic of the ultrahigh frequency band.

DISCLOSURE OF THE INVENTION

Technical Problems

The present invention is designed to solve the aforementioned problem. An object of the present invention is to precisely decode a reception signal by improving a phase noise estimation procedure of a terminal (or user equipment) in a wireless communication system.

Another object of the present invention is to minimize overhead of transmitting a signal for estimating phase noise.

The other object of the present invention is to improve performance of estimating phase noise.

The technical problems solved by the present invention are not limited to the above technical problems and other technical problems which are not described herein will become apparent to those skilled in the art from the following description.

Technical Solution

To achieve these and other advantages and in accordance with the purpose of the present invention, as embodied and broadly described, according to one embodiment, a method of transmitting a signal, which is transmitted by a base station to estimate phase noise in a communication system using an mmWave band, includes the steps of generating a phase data signal for estimating phase noise from a downlink signal, mapping the phase data signal to a partial region of a resource region to which a general data signal to be transmitted to a user equipment (UE) is mapped, and transmitting the general data signal and the phase data signal to the UE. In this case, a modulation order of the phase data signal can be equal to or lower than a modulation order of the general data signal.

The method can further include the step of transmitting at least one of information on whether or not the phase data signal is transmitted and information on the modulation order of the phase data signal to the UE.

Each of the information on whether or not the phase data signal is transmitted and the information on the modulation order of the phase data signal is transmitted to the UE via DCI (Downlink Control Information), MAC-CE (Medium Access Control-Control Element), or RRC (Radio Resource Control) signaling.

When the modulation order or an MCS (Modulation and Coding Scheme) level of the phase data signal is fixed by a predetermined value, the information on the modulation order of the phase data signal may not be transmitted to the UE.

When a modulation order or an MCS (Modulation and Coding Scheme) level of the general data signal satisfies a predetermined condition, the information on whether or not the phase data signal is transmitted may not be transmitted to the UE. Specifically, when the MCS level of the general data signal is equal to or higher than a specific value, the information on whether or not the phase data signal is transmitted may not be transmitted to the UE. Preferably, when the MCS level of the general data signal is equal to or greater than 24, the information on whether or not the phase data signal is transmitted may not be transmitted to the UE.

When the general data signal corresponds to a signal retransmitted to the UE, a pilot signal can be transmitted as the phase data signal.

To further achieve these and other advantages and in accordance with the purpose of the present invention, according to a different embodiment, a base station transmitting a signal for estimating phase noise in a communication system using an mmWave band includes a transmitter, a receiver, and a processor connected to the transmitter and the receiver to operate. In this case, the processor is configured to generate a phase data signal for estimating phase noise from a downlink signal, map the phase data signal to a partial region of a resource region that a general data signal to be transmitted to a user equipment (UE) is mapped, and transmit the general data signal and the phase data signal to the UE. In this case, a modulation order of the phase data signal can be equal to or lower than a modulation order of the general data signal.

Advantageous Effects

According to the embodiments of the present invention, the following effects may be expected.

First of all, since a phase noise estimation procedure of a user equipment is improved in a wireless communication system, it is able to precisely decode a reception signal.

Second, it is able to minimize overhead of a signal transmitted by a base station while phase noise estimation performance of a user equipment is improved.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE

Mode for Invention

Figure 1:
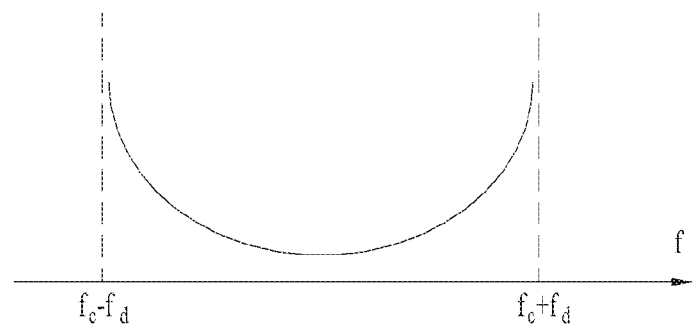
FIG. 1 is a diagram illustrating a Doppler spectrum.

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

In this document, the embodiments of the present invention have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

Communication of a device with a "cell" may mean that the device transmit and receive a signal to and from a base station of the cell. That is, although a device substantially transmits and receives a signal to a specific base station, for convenience of description, an expression "transmission and reception of a signal to and from a cell formed by the specific base station" may be used. Similarly, the term "macro cell" and/or "small cell" may mean not only specific coverage but also a "macro base station supporting the macro cell" and/or a "small cell base station supporting the small cell".

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

1. Communication System Using Ultrahigh Frequency Band

In an LTE (Long Term Evolution)/LTE-A (LTE Advanced) system, an error value of oscillators between a UE and an eNB is defined by requirements as follows.

UE Side Frequency Error (in TS 36.101)

The UE modulated carrier frequency shall be accurate to within ±0.1 PPM observed over a period of one time slot (0.5 ms) compared to the carrier frequency received from the E-UTRA Node B eNB Side Frequency Error (in TS 36.104)

Frequency error is the measure of the difference between the actual BS transmit frequency and the assigned frequency.

Meanwhile, oscillator accuracy according to types of BS is as listed in Table 1 below.

TABLE 1

| BS class | Accuracy |
| --- | --- |
| Wide Area BS | ±0.05 ppm |
| Local Area BS | ±0.1 ppm |
| Home BS | ±0.25 ppm |

Therefore, a maximum difference in oscillators between a BS and a UE is ±0.1 ppm, and when an error occurs in one direction, an offset value of maximum 0.2 ppm may occur. This offset value is converted to a unit of Hz suitable for each center frequency by being multiplied by the center frequency.

Meanwhile, in an OFDM system, a CFO value is varied depending on a subcarrier spacing. Generally, the OFDM system of which subcarrier spacing is sufficiently great is relatively less affected by even a great CFO value. Therefore, an actual CFO value (absolute value) needs to be expressed as a relative value that affects the OFDM system. This will be referred to as normalized CFO. The normalized CFO is expressed as a value obtained by dividing the CFO value by the subcarrier spacing. The following Table 2 illustrates CFO of an error value of each center frequency and oscillator and normalized CFO.

In Table 2, it is assumed that a subcarrier spacing is 15 kHz when the center frequency is 2 GHz (for example, LTE Rel-8/9/10). When the center frequency is 30 GHz or 60 GHz, a subcarrier spacing of 104.25 kHz is used, whereby throughput degradation is avoided considering Doppler effect for each center frequency. The above Table 2 is a simple example, and it will be apparent that another subcarrier spacing may be used for the center frequency.

Meanwhile, Doppler spread occurs significantly in a state that a UE moves at high speed or moves at a high frequency band. Doppler spread causes spread in a frequency domain, whereby distortion of a received signal is generated in view of the receiver. Doppler spread may be expressed as $f_{doppler} = (v/\lambda)\cos\theta$. At this time, $v$ is a moving speed of the UE, and $\lambda$ means a wavelength of a center frequency of a radio wave which is transmitted. $\theta$ means an angle between the radio wave and a moving direction of the UE. Hereinafter, description will be given on the assumption that $\theta$ is 0.

At this time, a coherence time is inverse proportion to Doppler spread. If the coherence time is defined as a time spacing of which correlation value of a channel response in a time domain is 50% or more, the coherence time is expressed as $$T_c \approx \frac{9}{16\pi f_{doppler}}.$$

In the wireless communication system, the following Equation 1 which indicates a geometric mean between an equation for Doppler spread and an equation for the coherence time is used mainly.

$$T_c = \sqrt{\frac{9}{16\pi f_{doppler}}} = \frac{0.423}{f_{doppler}} \quad \text{[Equation 1]}$$

FIG. 1 is a diagram illustrating a Doppler spectrum.

A Doppler spectrum or Doppler power spectrum density, which indicates a change of a Doppler value according to a frequency change, may have various shapes depending on a communication environment. Generally, in an environment, such as downtown area, where scattering occurs frequently, if received signals are received at the same power in all directions, the Doppler spectrum is indicated in the form of U-shape as shown in FIG. 1. FIG. 1 shows a U-shaped Doppler spectrum when the center frequency is $f_c$ and a maximum Doppler spread value is $f_d$.

Figure 2:
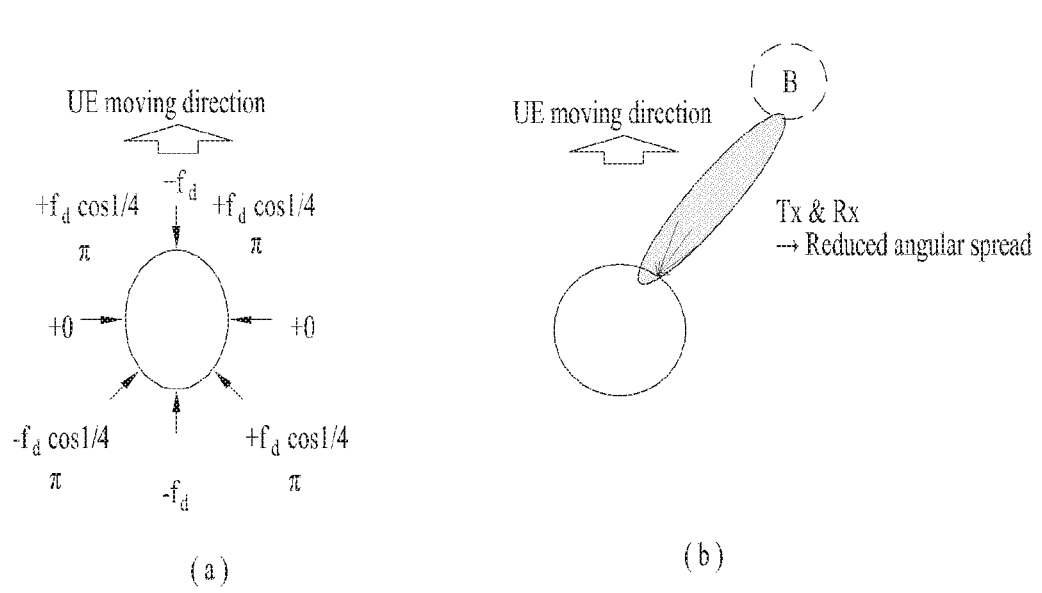
FIG. 2 is a diagram illustrating narrow beamforming related to the present invention.
Figure 3:
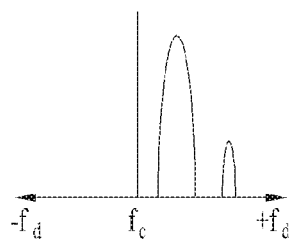
FIG. 3 is a diagram illustrating a Doppler spectrum when narrow beamforming is performed.

FIG. 2 is a diagram illustrating narrow beamforming related to the present invention, and FIG. 3 is a diagram illustrating a Doppler spectrum when narrow beamforming is performed.

In the ultrahigh frequency wireless communication system, since the center frequency is located at a very high band, a size of an antenna is small and an antenna array comprised of a plurality of antennas may be installed in a

TABLE 2

| Center frequency | Oscillator Offset | | | |
| --- | --- | --- | --- | --- |
| (subcarrier spacing) | ±0.05 ppm | ±0.1 ppm | ±10 ppm | ±20 ppm |
| 2 GHz (15 kHz) | ±100 Hz (±0.0067) | ±200 Hz (±0.0133) | ±20 kHz (±1.3) | ±40 kHz (±2.7) |
| 30 GHz (104.25 kHz) | ±1.5 kHz (±0.014) | ±3 kHz (±0.029) | ±300 kHz (±2.9) | ±600 kHz (±5.8) |
| 60 GHz (104.25 kHz) | ±3 kHz (±0.029) | ±6 kHz (±0.058) | ±600 kHz (±5.8) | ±1.2 MHz (±11.5) | small space. This characteristic enables pin-point beamforming, pencil beamforming, narrow beamforming, or sharp beamforming, which is based on several tens of antennas to several hundreds of antennas. This narrow beamforming means that a received signal is received at a certain angle only not a constant direction.

FIG. 2(a) illustrates that a Doppler spectrum is represented in the form of U-shape depending on a signal received in a constant direction, and FIG. 2(b) illustrates that narrow beamforming based on a plurality of antennas is performed.

As described above, if narrow beamforming is performed, the Doppler spectrum is represented to be narrower than U-shape due to reduced angular spread. As shown in FIG. 3, it is noted from the Doppler spectrum when narrow beamforming is performed that Doppler spread is generated at a certain band only.

The aforementioned wireless communication system using the ultrahigh frequency band operates on a band having a center frequency ranging from several GHz to several tens of GHz. The characteristics of such a center frequency further worsen Doppler Effect generated from migration of a user equipment or influence of CFO due to an oscillator difference between a transmitter and a receiver.

Figure 4:
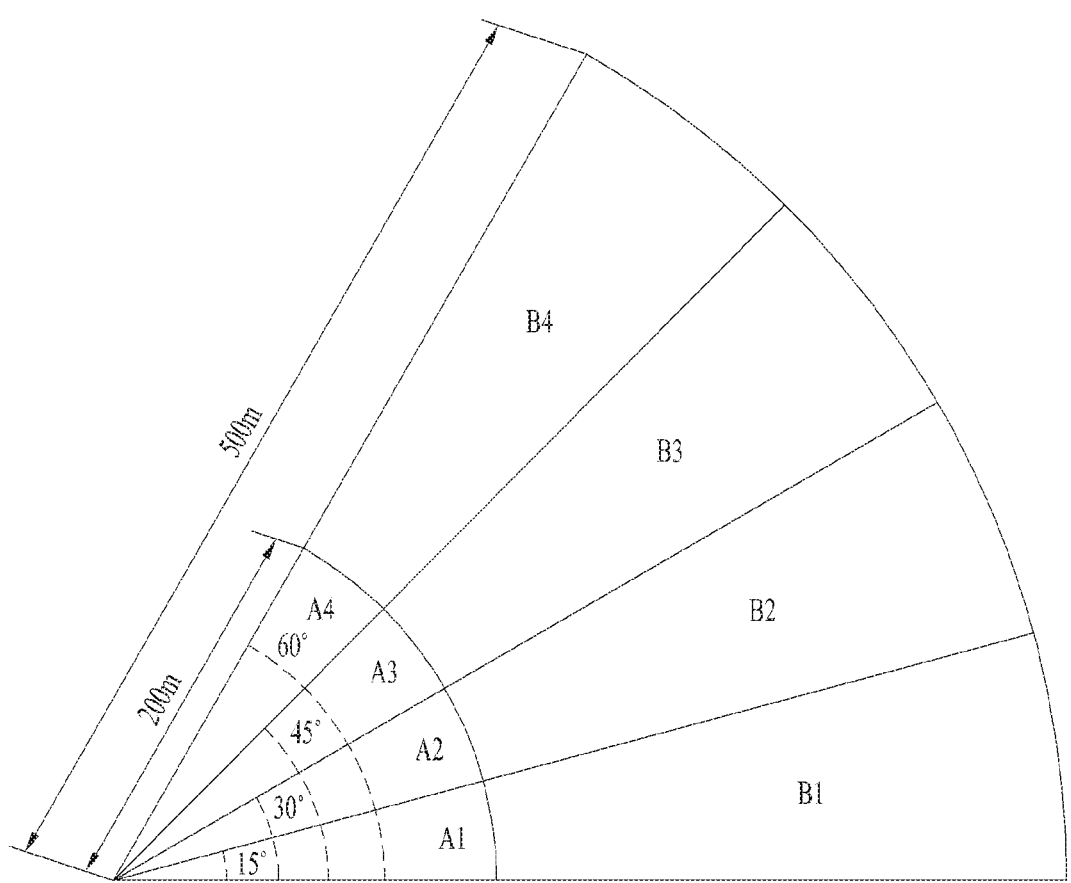
FIG. 4 is a diagram showing an example of a synchronization signal service area of a base station.

FIG. 4 is a diagram showing an example of a synchronization signal service area of a base station.

A user equipment (hereinafter abbreviated UE) performs synchronization with a base station using a downlink (DL) synchronization signal transmitted by the base station. In such a synchronization process, timing and frequency are synchronized between the base station and the UE. In order to enable UEs in a specific cell to receive and use a synchronization signal in a synchronization process, the base station transmits the synchronization signal by configuring a beam width as wide as possible.

Meanwhile, in case of an mmWave communication system that uses a high frequency band, a path loss in synchronization signal transmission appears greater than that of a case of using a low frequency band. Namely, a system using a high frequency band has a supportable cell radius reduced more than that of a related art cellular system (e.g., LTE/LTE-A) using a relatively low frequency band (e.g., 6 GHz or less).

As a method for solving the reduction of the cell radius, a synchronization signal transmitting method using a beamforming may be used. Although a cell radius increases in case of using a beamforming, a beam width is reduced disadvantageously. Equation 2 shows variation of a received signal SINR according to a beam width.

$$W \rightarrow M^{-2}W$$

$$SINR \rightarrow M^2 SINR \qquad \text{[Formula 2]}$$

If a beam width is reduced by $M^{-2}$ time according to a beamforming, Equation 2 indicates that a received SINR is improved by $M^2$ times.

Beside such a beamforming scheme, as another method for solving the cell radius reduction, it is able to consider a scheme of transmitting a same synchronization signal repeatedly. In case of such a scheme, although an addition resource allocation is necessary or a time axis, a cell radius can be advantageously increased without a decrease of a beam width.

Meanwhile, a base station allocates a resource to each UE by scheduling a frequency resource and a time resource located in a specific section. In the following, such a specific section shall be defined as a sector. In the sector shown in FIG. 4, A1, A2, A3 and A4 indicate sectors having widths of 0~15', 15~30', 30~45' and 45~60' in radius of 0~200 m, respectively. B1, B2, B3 and B4 indicate sectors having widths of 0~15', 15~30', 30~45' and 45~60' in radius of 200~500 m, respectively. Based on the substance shown in FIG. 4, sector 1 is defined as {A1, A2, A3, A4} and sector 2 is defined as {A1, A2, A3, A4, B1, B2, B3, B4}. Moreover, if a current synchronization signal service area of a base station is the sector 1, in order for the base station to service a synchronization signal for the sector 2, assume that an additional power over 6 dB is required for a transmission of a synchronization signal.

First of all, in order to service the sector 2, the base station can obtain an additional gain of 6 dB using a beamforming scheme. Through such a beamforming process, a service radius can be extended from A1 to B1. Yet, since a beam width is reduced through the beamforming, A2 to A3 cannot be serviced simultaneously. Hence, when a beamforming is performed, a synchronization signal should be sent to each of the A2~B2, A3~B3, and A4~B4 sectors separately. So to speak, in order to service the sector 2, the base station should transmit the synchronization signal by performing the beamforming four times.

On the other hand, considering the aforementioned repetitive transmission of the synchronization signal, the base station may be able to transmit the synchronization signal to the whole sector 2. Yet, the synchronization signal should transmit the synchronization signal on a time axis repeatedly four times. Consequently, a resource necessary to service the sector 2 is identical for both a beamforming scheme and a repetitive transmission scheme.

Yet, since a beam width is narrow in case of to beamforming scheme, a UE moving fast or a UE located on a sector boundary has difficulty in receiving a synchronization signal stably. Instead, if an ID of a UE located beam is identifiable, a UE can advantageously grasp its location through a synchronization signal. On the contrary, since a beam width is wide in case of a repetitive transmission scheme, it is less probable that a UE misses a synchronization signal. Instead, the UE is unable to grasp its location.

Figure 5:
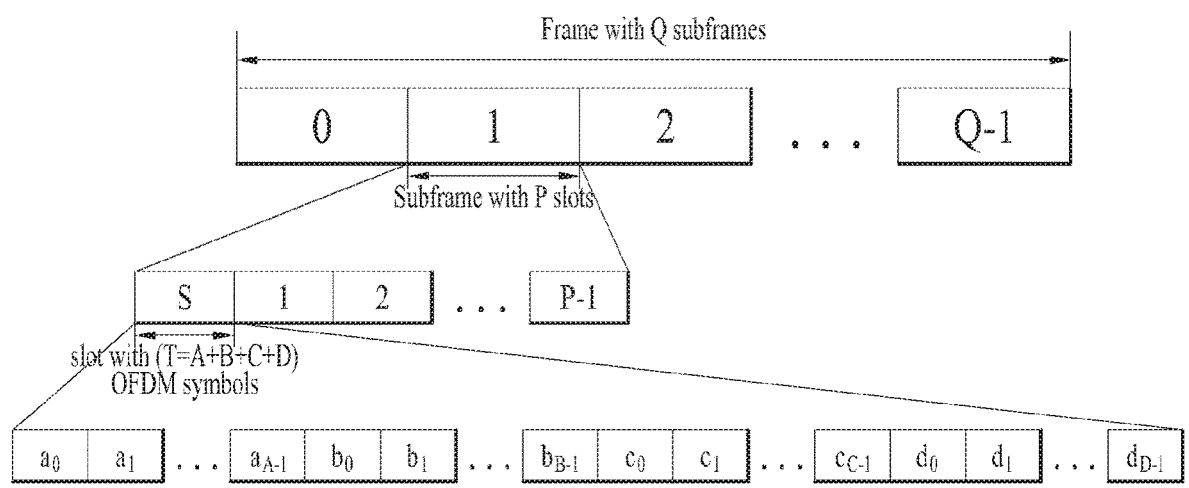
FIG. 5 shows an example of a frame structure proposed in a communication environment that uses mmWave.

FIG. 5 shows an example of a frame structure proposed in a communication environment that uses mmWave.

First of all, a single frame is configured with Q subframes, and a single subframe is configured with P slots. And, one slot is configured with T OFDM symbols. Here, unlike other subframes, a first subframe in a frame uses $0^{th}$ slot (slot denoted by 'S') for the usage of synchronization. And, the $0^{th}$ slot is configured with A OFDM symbols for timing and frequency synchronization, B OFDM symbols for beam scanning, and C OFDM symbols for informing a UE of system information. And, the remaining D OFDM symbols are used for data transmission to each UE.

Meanwhile, such a frame structure is a simple example only. Q, P, T, S, A, B, C and D are random values, and may include values set by a user or values set automatically on a system.

In the following, algorithm of timing synchronization between a base station and a UE is described. Let's consider a case that the base station transmits the same synchronization signal A times in FIG. 5. Based on the synchronization signal transmitted by the base station, the UE performs timing synchronization using the algorithm of Equation 3.

$$\hat{n} = \arg\max_{\tilde{n}} \frac{\left|\sum_{i=0}^{A-2} y_{\tilde{n},i}^H y_{\tilde{n},i+1}\right|}{\sum_{i=0}^{A-2} |y_{\tilde{n},i}^H y_{\tilde{n},i+1}|} \quad \text{[Equation 3]}$$

where $y_{\tilde{n},i} \triangleq r[\tilde{n} + i(N + N_g):\tilde{n} + i(N + N_g) + N - 1]$ In Equation 3, N, $N_g$ and i indicate a length of OFDM symbol, a length of CP (Cyclic Prefix) and an index of OFDM symbol, respectively. r means a vector of a received signal in a receiver. Here, the equation $y_{\tilde{n},i} \triangleq r[\tilde{n}+i(N+N_g):\tilde{n}+i(N+N_g)+N-1]$ is a vector defined with elements ranging from $(\tilde{n}+i(N+N_g))^{th}$ element to $(\tilde{n}+i(N+N_g)+N-1)^{th}$ element of the received signal vector r.

The algorithm of Equation 3 operates on the condition that 2 OFDM received signals adjacent to each other temporally are equal to each other. Since such an algorithm can use a sliding window scheme, it can be implemented with low complexity and has a property robust to a frequency offset.

Meanwhile, Equation 4 represents an algorithm of performing timing synchronization using correlation between a received signal and a signal transmitted by a base station.

$$\hat{n} = \arg\max_{\tilde{n}} \frac{\left|\sum_{i=0}^{A-1} y_{\tilde{n},i}^H s\right|^2}{\sum_{i=0}^{A-1} |y_{\tilde{n},i}|^2 \sum_{i=0}^{A-1} |s|^2} \quad \text{[Equation 4]}$$

In Equation 4, s means a signal transmitted by a base station and is a signal vector pre-agreed between a UE and a base station. Although the way of Equation 4 may have performance better than that of Equation 3, since Equation 4 cannot be implemented by a sliding window scheme, it requires high complexity. And, the way of Equation 4 has a property vulnerable to a frequency offset.

In continuation with the description of the timing synchronization scheme, a beam scanning process is described as follows. First of all, a beam scanning means an operation of a transmitter and/or a receiver that looks for a direction of a beam that maximizes a received SINR of the receiver. For example, a base station determines a direction of a beam through a beam scanning before transmitting data to a UE.

Further description is made by taking FIG. 4 as one example. FIG. 4 shows that a sector serviced by a single base station is divided into 8 areas. Here, the base station transmits a beam to each of (A1+B1), (A2+B2), (A3+B3) and (A4+B4) areas, and a UE can identify the beams transmitted by the base station. On this condition, a beam scanning process can be embodied into 4 kinds of processes. First of all, the base station transmits beams to 4 areas in sequence [i]. The UE determines a beam decided as a most appropriate beam among the beams in aspect of a received SINR [ii]. The UE feeds back information on the selected beam to the base station [iii]. The base station transmits data using a beam having the direction of the feedback [iv]. Through the above beam scanning process, the UE can receive DL data through a beam having an optimized received SINR.

Zadoff-Chu sequence is described in the following. Zadoff-Chu sequence is called Chu sequence or ZC sequence and defined as Equation 5.

$$x_r[n] = e^{\frac{j\pi r n(n+1)}{N}} \quad \text{[Equation 5]}$$

In Equation 5, N indicates a length of sequence, r indicates a root value, and $x_r[n]$ indicates an $n^{th}$ element of ZC sequence. The ZC sequence is characterized in that all elements are equal to each other in size [constant amplitude]. Moreover, a DFT result of ZC sequence is also identical for all elements.

In the following, ZC sequence and a cyclic shifted version of the ZC sequence have the following correlation such as Equation 6.

$$(x_r^{(i)})^H x_r^{(j)} = \begin{cases} N & \text{for } i = j \\ 0 & \text{elsewhere} \end{cases} \quad \text{[Equation 6]}$$

In Equation 6, $x_r^{(i)}$ is a sequence resulting from cyclic-shifting $x_r$ by i, and indicates 0 except a case that auto-correlation of ZC sequence is i=j. The ZC sequence also has zero auto-correlation property and may be expressed as having CAZAC (Constant Amplitude Zero Auto Correlation) property.

Regarding the final property of the ZC sequence ZC, the correlation shown in Equation 7 is established between ZC sequences having a root value that is a coprime of a sequence length N.

$$x_{r_1}^H x_{r_2} = \begin{cases} N & \text{for } r_1 = r_2 \\ \frac{1}{\sqrt{N}} & \text{elsewhere} \end{cases} \quad \text{[Equation 7]}$$

In equation 7, $r_1$ or $r_2$ is a coprime of N. For example, if N=111, $2 \le r_1, r_2 \le 110$ always meets Equation 7. Unlike auto-correlation of Equation 6, the mutual correlation of ZC sequence does not become 0 completely.

In continuation with ZC sequence, Hadamard matrix is described. The Hadamard matrix is defined as Equation 8.

$$H_{2^k} = \begin{bmatrix} H_{2^{k-1}} & H_{2^{k-1}} \\ H_{2^{k-1}} & -H_{2^{k-1}} \end{bmatrix} = H_2 \otimes H_{2^{k-1}} \quad \text{[Equation 8]}$$

where $H_1 = [1]$ $$H_2 = \begin{bmatrix} 1 & 1 \\ 1 & -1 \end{bmatrix}$$

In Equation 8, $2^k$ indicates a size of matrix. Hadamard matrix is a unitary matrix that always meets $H_n H_n^T = nI_n$ irrespective of a size n. Moreover, in Hadamard matrix, all columns and all rows are orthogonal to each other. For example, if n=4, Hadamard matrix is defined as Equation 9.

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad \text{[Equation 9]}$$

From Equation 9, it can be observed that columns and rows are orthogonal to each other.

Figure 6:
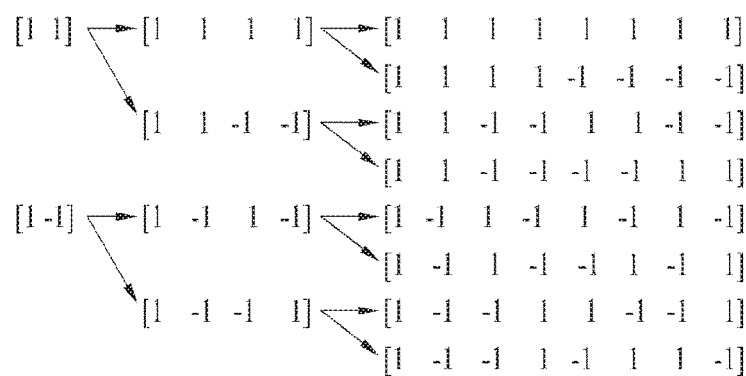
FIG. 6 shows a structure of OVSF (orthogonal variable spreading factor) code.

FIG. 6 shows a structure of OVSF (orthogonal variable spreading factor) code. The OVSF code is the code generated on the basis of Hadamard matrix and has specific rules.

First of all, in diverging to the right in the OVSF code [lower branch], a first code repeats a left mother code twice as it is and a second code is generated from repeating an upper code once, inverting it and then repeating the inverted code once. FIG. 6 shows a tree structure of OVSF code.

Such an OVSF code secures all orthogonality except the relation between adjacent mother and child codes on a code tree. For example, in FIG. 6, a code [1 −1 1 −1] is orthogonal to all of [1 1], [1 1 1 1], and [1 1 −1 −1]. Moreover, regarding the OVSF code, a length of code is equal to the number of available codes. Namely, it can be observed from FIG. 6 that a length of a specific ode is equal to the total number in a branch having the corresponding code belong thereto.

Figure 7:
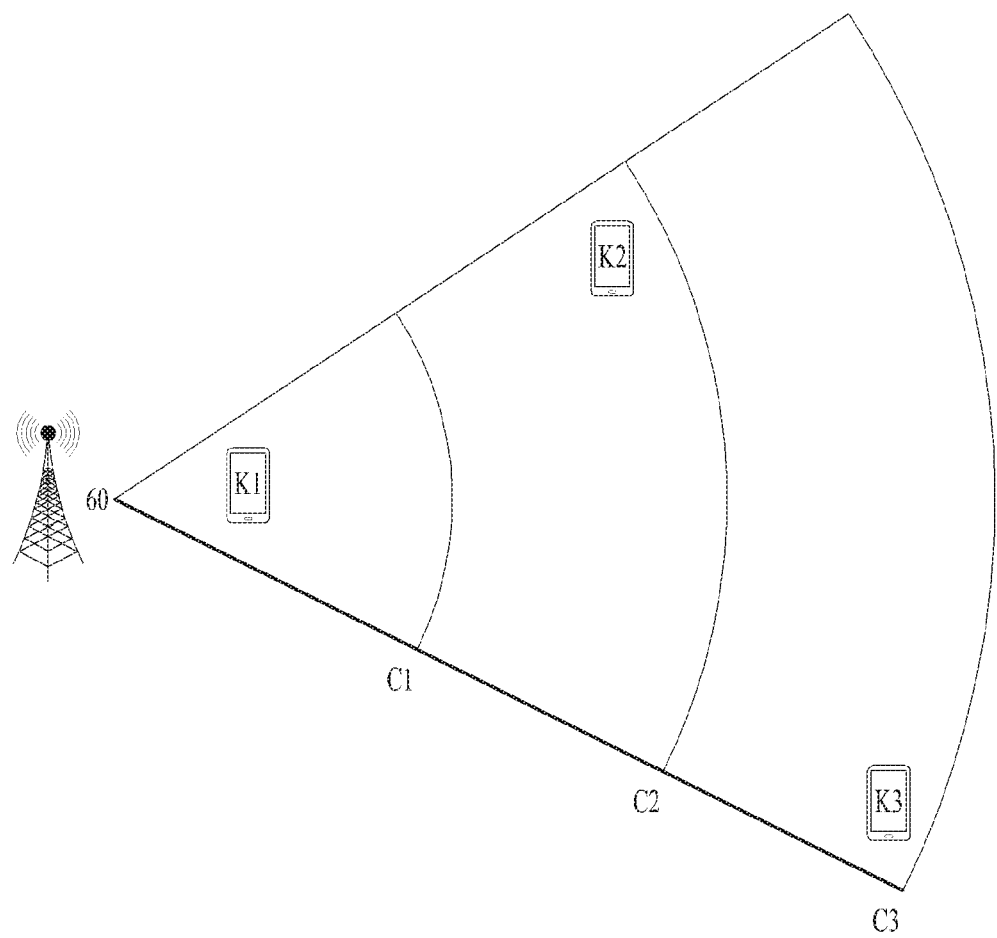
FIG. 7 is a diagram to describe a disposed situation of user equipments.

FIG. 7 is a diagram to describe a disposed situation of user equipments. RACH (Random Access CHannel) is described with reference to FIG. 7.

In case of LTE system, when RACH signals transmitted by UEs arrive at a base station, powers of the RACH signals of UEs received by the base station should be equal to each other. To this end, the base station defines a parameter 'preambleInitialReceivedTargetPower', thereby broadcasting the parameter to all UEs within a corresponding cell through SIB (System Information Block) 2. The UE calculates a pathloss using a reference signal, and then determines a transmit power of the RACH signal using the calculated pathloss and the parameter 'preambleInitialReceivedTargetPower' like Equation 10.

$$P\_PRACH\_Initial=\min\{P\_CMAX, preambleInitialReceivedTargetPower+PL\} \quad [\text{Equation 10}]$$

In Equation 10, P_PRACH_Initial, P_CMAX, and PL indicate a transmit power of RACH signal, a maximum transmit power of UE, and a pathloss, respectively.

Equation 10 is taken as one example for the following description. A maximum transmittable power of UE is assumed as 23 dBm, and a RACH reception power of a base station is assumed as −104 dBm. And, a UE disposed situation is assumed as FIG. 7.

First of all, a UE calculates a pathloss using a received synchronization signal and a beam scanning signal and then determines a transmit power based on the calculation. Table 3 shows a pathloss of UE and a corresponding transmit power.

TABLE 3

| UE | preambleInitialReceivedTargetPower | Pathloss | Necessary transmit power | Transmit power | Additional necessary power |
|---|---|---|---|---|---|
| K1 | −104 dBm | 60 dB | −44 dBm | −44 dBm | 0 dBm |
| K2 | −104 dBm | 110 dB | 6 dBm | 6 dBm | 0 dBm |
| K3 | −104 dBm | 130 dB | 26 dBm | 23 dBm | 3 dBm |

In case of a UE K1 in table 3, a pathloss is very small. Yet, in order to match an RACH reception power, an RACH signal should be transmitted with very small power (−44 dBm). Meanwhile, in case of a UE K2, although a pathloss is big, a necessary transmit power is 6 dBm. Yet, in case of a UE K3, since a pathloss is very big, a necessary transmit power exceeds P_CMA=23 dBm. In this case, the UE should perform a transmission with 23 dBm that is a maximum transmit power and a rate of UE's RACH access success is degraded by 3 dB.

In the following, phase noise related to the present invention is explained. Jitter generated on a time axis appears as phase noise on a frequency axis. As shown in equation 11 in the following, the phase noise randomly changes a phase of a reception signal on the time axis.

$$r_n = s_n e^{j\phi_n} \quad [\text{Equation 11}]$$

$$\text{where } s_n = \sum_{k=0}^{N-1} d_k e^{j2\pi \frac{kn}{N}}$$

Parameters $r_n$, $s_n$, $d_k$, $\phi_n$ of the equation 11 respectively indicate a reception signal, a time axis signal, a frequency axis signal, and a phase rotation value due to the phase noise. In the equation 11, if the reception signal is passing through a DFT (Discrete Fourier Transform) procedure, it may be able to have equation 12 described in the following.

$$y_k = d_k \frac{1}{N}\sum_{n=0}^{N-1} e^{j\phi_n} + \frac{1}{N}\sum_{\substack{t=0 \\ t\neq k}}^{N-1} d_t \sum_{n=0}^{N-1} e^{j\phi_n} e^{j2\pi(t-k)n/N} \quad [\text{Equation 12}]$$

In the equation 12, $$\frac{1}{N}\sum_{n=0}^{N-1} e^{j\phi_n}, \quad \frac{1}{N}\sum_{\substack{t=0 \\ t\neq k}}^{N-1} d_t \sum_{n=0}^{N-1} e^{j\phi_n} e^{j2\pi(t-k)n/N}$$

parameters indicate a CPE (common phase error) and ICI (inter-cell interference), respectively. In this case, as correlation between phase noises is getting bigger, the CPE of the equation 12 has a bigger value.

Meanwhile, according to the PCT application applied with the international application number PCT/KR2016/000594, a method of estimating CFO (Carrier Frequency Offset) has been proposed to define the CFO, solve a problem of the CFO, and eliminate the CFO in a wireless LAN system. The present application includes all contents of the PCT application applied with the international application number PCT/KR2016/000594.

In this viewpoint, the aforementioned CPE can be regarded as a sort of the CFO. However, in the aspect of a terminal, the CPE and the CFO can be similarly interpreted. In particular, in the aspect of a terminal, a process of estimating the CPE should be preferentially performed to eliminate the CPE corresponding to phase noise on a frequency axis. The process of estimating the CPE and the process of estimating the CFO proposed in the previously applied PCY application (international application number PCT/KR2016/000594) can be comprehended as a similar meaning.

2. Proposed Method of Transmitting Signal for Estimating CPE

As mentioned in the foregoing description, when a user equipment (UE) performs a process of estimating CPE on a reception signal, the process should be preferentially performed prior to precise decoding on the reception signal. In particular, in order to make the UE accurately estimate the CPE, a base station can transmit a predetermined signal to the UE. In the following, an embodiment of a method for the base station to transmit a signal for estimating CPE is proposed.

Figure 8:
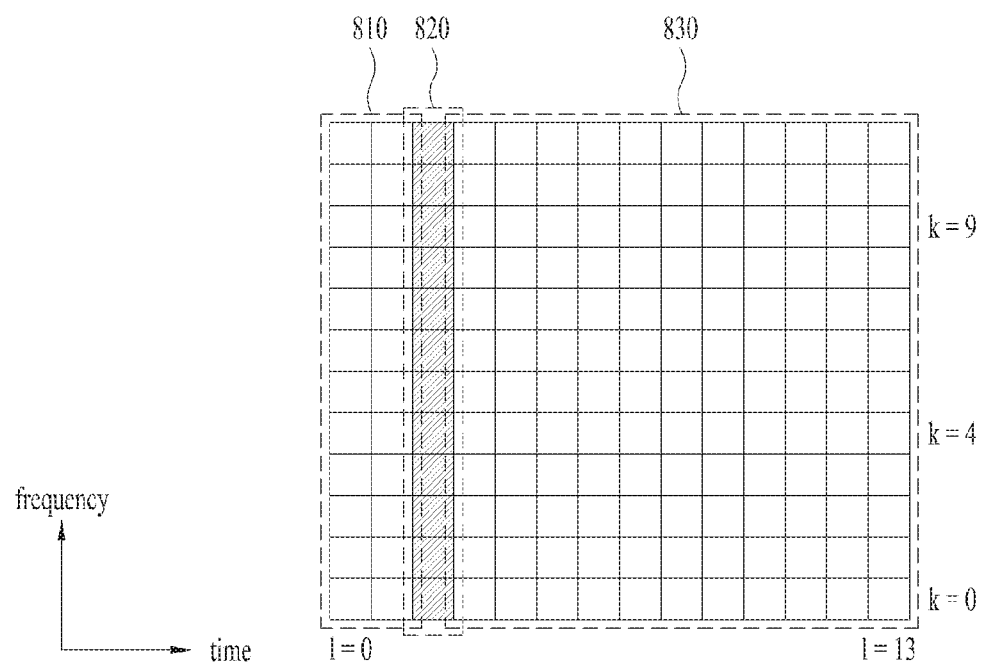
FIGS. 8 and 9 are diagrams illustrating a structure of a resource region related to an embodiment proposed in the present invention.

FIG. 8 is a diagram illustrating a structure of a resource region related to an embodiment proposed in the present invention. In relation to the embodiment proposed with reference to FIG. 8, a PCRS (Phase Compensation Reference Signal) or a PNRS (Phase Noise Reference Signal) is explained first.

A communication system using such a ultrahigh frequency band as mmWave uses a frequency band having physical characteristic different from that of a legacy LTE/LTE-A communication system. Hence, a resource structure different from a structure of using a resource region in the legacy communication system is proposed. FIG. 8 illustrates an example of using a resource region in DL of a new communication system.

It may consider an RB pair consisting of 14 OFDM (Orthogonal Frequency Division Multiplexing) symbols in a horizontal axis and 12 subcarriers in a vertical axis. In this case, first 2 (or 3) OFDM symbols 810 are allocated to a control channel (e.g., PDCCH (Physical Downlink Control Channel)), a next one OFDM symbol 820 is allocated to a DMRS (DeModulation Reference Signal), and the remaining OFDM symbols 830 are allocated to a data channel (e.g., PDSCH (Physical Downlink Shared Channel)).

Meanwhile, in the resource region structure illustrated in FIG. 8, a signal for estimating the aforementioned CPE (or CFO) can be transmitted to a UE in a manner of being carried on a partial RE (Resource Element) of a region 830 to which a data channel is assigned. The signal corresponds to a signal for estimating phase noise. The signal may correspond to a pilot signal known to a UE and a base station. Or, as described later, the signal may correspond to a signal of which data is changed or duplicated. In the following description, a series of signals for estimating phase noise are commonly referred to as a PCRS or a PNRS.

Meanwhile, a proposed embodiment explains a method of transmitting a data signal as a PCRS or a PNRS instead of a pilot signal. According to a method of transmitting a pilot signal already known to a UE and a base station as a PCRS or a PNRS, throughput is reduced as much as the number of REs in which the pilot signal is transmitted. Hence, the present invention proposes a method of transmitting a data signal not only to minimize the reduction of data transmission throughput but also to reduce the impact of phase noise and interference.

According to the proposed embodiment, a base station defines an additional signal which is modulated by a modulation order different from a modulation order of a data channel and transmits the signal to a UE via a partial region of a resource region in which the data channel is transmitted. The UE can compensate for hardware impairment by estimating a CPE, CFO, Doppler Effect, phase noise, and the like using the received signal.

According to the PCT application (international application number PCT/KR2016/000594) to which the present application refers, when high-order QAM (Quadrature Amplitude Modulation) is applied, a method of estimating CFO using a blind scheme and a method of estimating CFO using a data signal modulated by BPSK (Binary Phase Shift Keying)/QPSK (Quadrature Phase Shift Keying)/16-QAM without a pilot signal are proposed. In the embodiment proposed by the present invention, the CFO estimation methods are utilized.

In particular, as a modulation order is getting lower, a CFO/CPE estimation range is getting wider. And, as a modulation order is getting higher, a CFO/CPE estimation range is getting narrower. Hence, if a higher modulation order is applied, reliability of CFO/CPE estimation range can be degraded. In particular, an embodiment proposed in the present invention defines an additional data signal to which a different modulation order, which is distinguished from a modulation order of a data signal transmitted in a data region, is applied.

As mentioned in the foregoing description, the additional data signal corresponds to a signal for eliminating CPE or CFO. In order to distinguish the additional data signal from a generally transmitted data signal, the additional data signal is referred to as a 'phase data signal (or phase compensation signal)'. For clarity, the generally transmitted data signal is referred to as a 'general data signal'.

A modulation order of the phase data signal may be equal to or lower than a modulation order of the general data signal. For example, when the general data signal is modulated by 64-QAM, the phase data signal is modulated by 16-QAM or QPSK. A base station allocates a part of a resource region in which the general data signal is transmittable to the phase data signal and transmits the phase data signal to a UE together with the general data signal. The UE estimates and compensates for CPE, CFO, etc. using the received phase data signal.

Meanwhile, since a UE estimates CPE using a phase data signal having a relatively lower modulation order, the UE is able to obtain relatively higher performance compared to a case of using a general data signal. Moreover, since a modulation order is changed for a partial resource region in which a data channel is transmitted only, throughput loss is reduced compared to a case of using a pilot signal.

Meanwhile, according to a different embodiment proposed in the present invention, a base station informs a UE of information on whether or not a phase data signal (or PCRS/PNRS) is used and a modulation order of the phase data signal. In particular, when a phase data signal and a general data signal are transmitted to a UE, since it is necessary for the UE to modulate the phase data signal by applying a different modulation order to the phase data signal, the base station can inform the UE of information on whether or not the phase data signal is transmitted and a modulation order of the phase data signal. In this case, the base station can inform the UE of information related to the phase data signal via at least one of DCI (Downlink Control Information) and RRC (Radio Resource Control) signaling.

Subsequently, the abovementioned process is explained in detail. In the following, MO(n) corresponds to a modulation order of n bit applied to a phase data signal. For example, MO(0) corresponds to a transmission of a pilot signal, MO(1) corresponds to BPSK, MO(2) corresponds to QPSK, MO(4) corresponds to 16-QAM, and MO(6) corresponds to 64-QAM.

As mentioned in the foregoing description, the base station can inform the UE of information on whether or not a phase data signal is transmitted and a modulation order via DCI, MAC-CE (Medium Access Control-Control Element) and/or RRC signaling. According to one embodiment, the base station can inform the UE of both information on whether or not a phase data signal is transmitted and a modulation order via DCI. Although the method above corresponds to the most flexible method, the method has the greatest signaling overhead.

According to a different embodiment, the base station informs the UE of information on whether or not a phase data signal is transmitted via DCI and informs the UE of a modulation order via RRC signaling. When a modulation order of a phase data signal is fixed, the base station may not inform the UE of the modulation order. In this case, the base station informs the UE of information on whether or not the phase data signal is transmitted via DCI and may lower the modulation order as much as v compared to a modulation order applied to a general data signal. For example, when the modulation order applied to the general data signal corresponds to MO(n), the modulation order of the phase data signal may become MO(n−v). For example, when v corresponds to 2, if a general data signal is modulated by 64-QAM, a phase data signal may become 16-QAM. The v may correspond to a value already known to a UE via RRC signaling or a random fixed value.

According to a further different embodiment, the base station can inform the UE of a modulation order of a phase data signal only via RRC signaling. In this case, the base station can inform the UE of whether or not the modulation order transmitted via RRC signaling is used as it is rather than inform the UE of information on whether or not the phase data signal is transmitted via DCI. The base station may inform the UE that a pilot signal is transmitted while ignoring RRC signaling.

According to a further different embodiment, the base station can inform the UE of both information on whether or not a phase data signal is transmitted and a modulation order via RRC signaling. As a different example, when a general data signal satisfies a specific condition, although the base station does not inform the UE of information on whether or not a phase data signal is transmitted, the UE may autonomously recognize that the phase data signal is transmitted. For example, when a modulation order of a general data signal or an MCS (Modulation and Coding Scheme) level is determined by a predetermined value, whether or not a phase data signal is transmitted can be implicitly determined. In this case, a modulation order of the phase data signal can be transmitted to the UE via RRC signaling. When a fixed modulation order is used, it may not separately inform the UE of the modulation order. Specifically, when an MCS level of a general data is equal to or greater than 24, the UE may assume that a phase data is transmitted without a transmission of the phase data. In other word, when an MCS level of a general data is equal to or greater than 24, information indicating a modulation order of a phase data signal may not be transmitted to the UE.

When a phase data signal as a PCRS/PNRS is transmitted according to the aforementioned embodiments, it is able to reduce overhead for transmitting a pilot signal. Or, when a phase data signal is used as a PCRS/PNRS together with a pilot signal, since a UE is able to secure more samples for estimating phase noise, it may expect performance enhancement. In this case, when the modulation order or the MCS level of the general data signal is equal to or greater than 24, the UE may expect that a phase data signal is transmitted as a PNRS.

According to a further different embodiment, when a base station retransmits a data, a modulation order of a phase data signal may become 0. When the modulation order of the phase data signal corresponds to 0, it means that a pilot signal is transmitted as a PCRS/PNRS. When a data is retransmitted, it may correspond to a case that accurate information forwarding is more important than overhead. In particular, in order to minimize an error which is generated in the course of estimating CPE/CFO using a blind type, the base station may use a pilot signal instead of a phase data signal when data is retransmitted.

Figure 9:
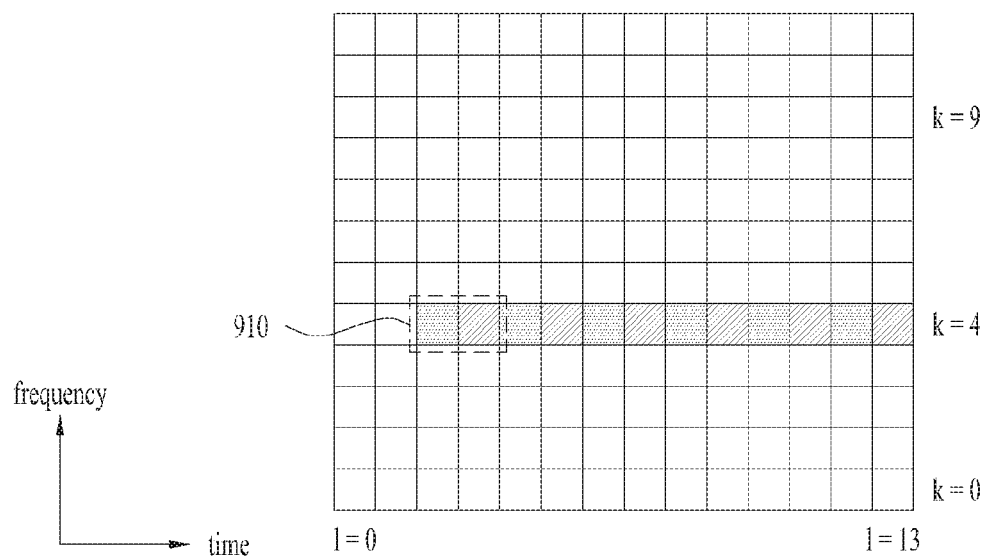

FIG. 9 is a diagram illustrating a structure of a resource region related to a different embodiment proposed in the present invention. In FIG. 9, an embodiment is explained for a case that a modulation order of a general data signal is identical to a modulation order of a phase data signal.

Referring to FIG. 9, a base station can map a phase data signal to an RE in which a general data signal is transmitted and an RE having the same position on a frequency axis and the RE adjacent to a time axis. In this case, since the general data signal and the phase data signal have the same modulation order, the phase data signal becomes a signal identical to a general data signal of an adjacent RE. In particular, referring to FIG. 9, the base station can transmit the same data signal to the UE by mapping the signal to two REs adjacent to each other (an RE of which k corresponds to 4 and l corresponds to 2 and an RE of which k corresponds to 4 and l corresponds to 3). FIG. 9 illustrates an example that a phase data signal is transmitted with an interval of two OFDM symbols on a subcarrier of which k corresponds to 4 ({k=4, l=2, 3}, {k=4, l=4, 5}, . . . , {k=4, l=12, 13}). The base station can map the same data signal to two adjacent REs.

Meanwhile, since data signals carried on two REs are the same, the UE can estimate CPE/CFO from the data signals of a pair of REs. According to the embodiment above, overhead for transmitting a phase data signal is reduced by half compared to a case of using a pilot signal. And, according to the scheme of FIG. 9, since it is not necessary to separately define a modulation order of a phase data signal, although a modulation order of a general data signal is defined as high, it does not influence on performance. Hence, it is able to obtain a great amount of gains when it is not necessary to estimate CPE/CFO in every OFDM symbol.

Meanwhile, in the embodiment of FIG. 9, a base station can inform a UE of information on whether or not a phase data signal is transmitted and a transmission interval via DCI and/or RRC signaling. If a size of CPE/CFO is small due to the characteristic of a communication channel and a change is slowly progressing, the transmission interval (i.e., a space between REs in which a phase data signal is transmitted) of the phase data signal can be configured to be relatively long (e.g., {k=4, l=2, 3}, {k=4, l=6, 7}, . . . , {k=4, l=10, 11}). It is able to more reduce overhead for transmitting a phase data signal by adjusting a transmission interval of the phase data signal.

The base station can configure a modulation order of a phase data signal to be lower than a modulation order of a general data signal. Or, the base station can configure a modulation order of a phase data signal to be equal to a modulation order of a general data signal. These configuration schemes can be selectively performed. The latter one has a merit in that CFO/CPE estimation performance is guaranteed irrespective of a modulation order of a general data signal. Hence, when a data channel is initially transmitted, it may be able to estimate a relatively big CPE/CFO value according to the latter configuration scheme. Meanwhile, when consecutive data channels are transmitted, it may be able to estimate a relatively small CPE/CFO value in every OFDM symbol using the former configuration scheme.

Figure 10:
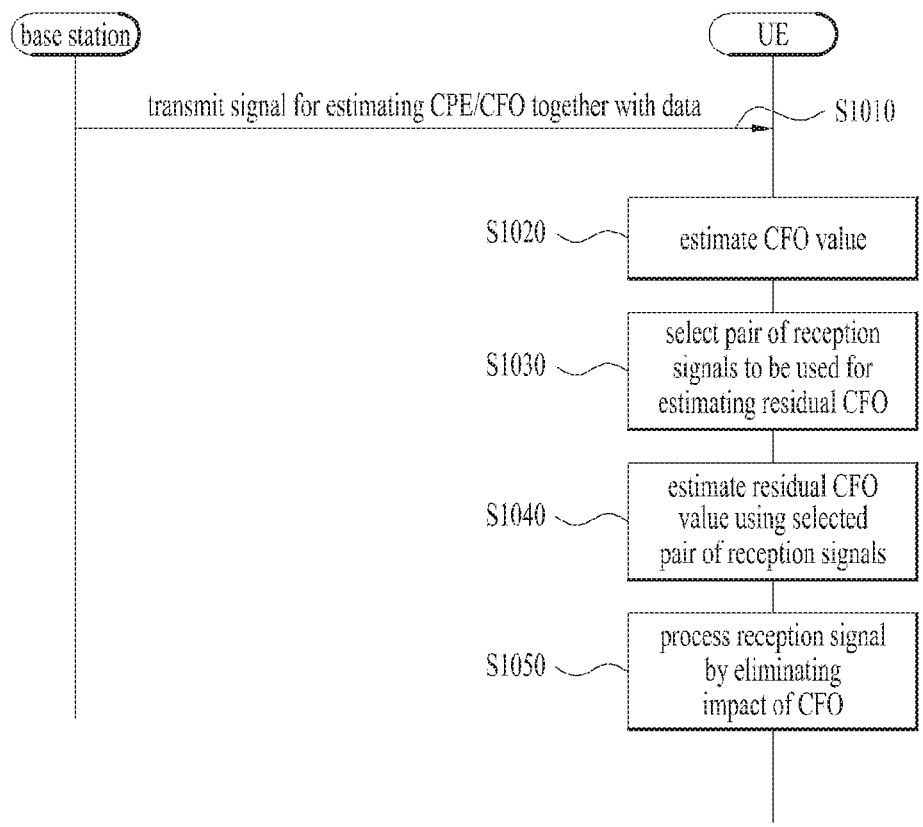
FIG. 10 is a flowchart illustrating operation methods of a base station and a user equipment according to an embodiment proposed in the present invention.

FIG. 10 is a flowchart illustrating operation methods of a base station and a user equipment according to an embodiment proposed in the present invention. The base station transmits a signal (e.g., PCRS or PNRS) for estimating CPE/CFO and data to the UE [S1010]. In the aforementioned embodiments, it has been explained as the signal has a modulation order identical to a modulation order of a general data signal and the signal is defined as a phase data signal corresponding to a different data signal. Having received the phase data signal, the UE estimates a CPE/CFO value using the phase data signal (S1020 to S1040). The CPE/CFO estimation procedure of a blind type is described in detail in the application to which the present invention refers. When the CPE/CFO estimation is completed, the UE estimates phase noise by eliminating an impact of CPE/CFO from the received signal [S1050].

In the foregoing description, although the embodiments are explained on the basis of a downlink procedure that the base station transmits a phase data signal to the UE, the embodiments can be similarly applied to an uplink procedure. In particular, it is able to apply a phase data signal to uplink signaling transmitted to the base station by the UE. To this end, the base station can inform the UE of information on whether or not a phase data is transmitted, a modulation order, a transmission interval, and the like via a UL grant in advance.

3. Device Configuration

Figure 11:
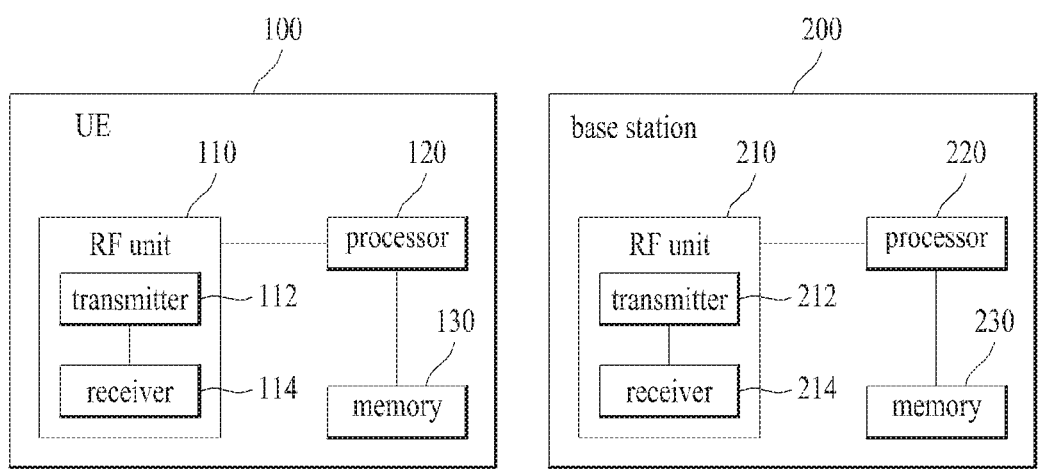
FIG. 11 is a diagram illustrating configurations of a user equipment and a base station related to an embodiment proposed in the present invention.

FIG. 11 is a block diagram showing the configuration of a user equipment and a base station according to one embodiment of the present invention. In FIG. 1511 the user equipment 100 and the base station 200 may include radio frequency (RF) units 110 and 210, processors 120 and 220 and memories 130 and 230, respectively. Although a 1:1 communication environment between the user equipment 100 and the base station 200 is shown in FIG. 11, a communication environment may be established between a plurality of user equipment and the base station. In addition, the base station 200 shown in FIG. 11 is applicable to a macro cell base station and a small cell base station.

The RF units 110 and 210 may include transmitters 112 and 212 and receivers 114 and 214, respectively. The transmitter 112 and the receiver 114 of the user equipment 100 are configured to transmit and receive signals to and from the base station 200 and other user equipments and the processor 120 is functionally connected to the transmitter 112 and the receiver 114 to control a process of, at the transmitter 112 and the receiver 114, transmitting and receiving signals to and from other apparatuses. The processor 120 processes a signal to be transmitted, sends the processed signal to the transmitter 112 and processes a signal received by the receiver 114.

If necessary, the processor 120 may store information included in an exchanged message in the memory 130. By this structure, the user equipment 100 may perform the methods of the various embodiments of the present invention.

The transmitter 212 and the receiver 214 of the base station 200 are configured to transmit and receive signals to and from another base station and user equipments and the processor 220 are functionally connected to the transmitter 212 and the receiver 214 to control a process of, at the transmitter 212 and the receiver 214, transmitting and receiving signals to and from other apparatuses. The processor 220 processes a signal to be transmitted, sends the processed signal to the transmitter 212 and processes a signal received by the receiver 214. If necessary, the processor 220 may store information included in an exchanged message in the memory 230. By this structure, the base station 200 may perform the methods of the various embodiments of the present invention.

The processors 120 and 220 of the user equipment 100 and the base station 200 instruct (for example, control, adjust, or manage) the operations of the user equipment 100 and the base station 200, respectively. The processors 120 and 220 may be connected to the memories 130 and 230 for storing program code and data, respectively. The memories 130 and 230 are respectively connected to the processors 120 and 220 so as to store operating systems, applications and general files.

The processors 120 and 220 of the present invention may be called controllers, microcontrollers, microprocessors, microcomputers, etc. The processors 120 and 220 may be implemented by hardware, firmware, software, or a combination thereof.

If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

Meanwhile, the aforementioned method may be implemented as programs executable in computers and executed in general computers that operate the programs using computer readable media. In addition, data used in the aforementioned method may be recorded in computer readable recording media through various means. It should be understood that program storage devices that can be used to describe storage devices including computer code executable to perform various methods of the present invention do not include temporary objects such as carrier waves or signals. The computer readable media include storage media such as magnetic recording media (e.g. ROM, floppy disk and hard disk) and optical reading media (e.g. CD-ROM and DVD).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The aforementioned contents can be applied not only to 3GPP LTE and LTE-A system but also to various wireless communication systems including an IEEE 802.16x system and IEEE 802.11x system. Further, the proposed method can also be applied to an mmWave communication system using ultrahigh frequency band.

What is claimed is:

1. A method of transmitting a signal for estimating phase noise by a base station in a communication system using an mmWave band, the method comprising:
   transmitting at least one of information on whether or not a phase data signal is transmitted and information on a modulation order of the phase data signal to a user equipment (UE),
   generating the phase data signal for estimating phase noise from a downlink signal;
   mapping the phase data signal to a partial region of a resource region that a general data signal to be transmitted to the UE is mapped; and
   transmitting the general data signal and the phase data signal to the UE,
   wherein the modulation order of the phase data signal is equal to or lower than a modulation order of the general data signal, and
   wherein based on the modulation order or a Modulation and Coding Scheme (MCS) level of the general data signal satisfying a predetermined condition, the information on whether or not the phase data signal is transmitted is not transmitted to the UE.

2. The method of claim 1, wherein each of the information on whether or not the phase data signal is transmitted and the information on the modulation order of the phase data signal is transmitted to the UE via Downlink Control Information (DCI), Medium Access Control—Control Element (MAC-CE), or Radio Resource Control (RRC) signaling.

3. The method of claim 1, wherein when the modulation order or the MCS level of the phase data signal is fixed by a predetermined value, the information on the modulation order of the phase data signal is not transmitted to the UE.

4. The method of claim 1, wherein when the MCS level of the general data signal is equal to or higher than a specific value, the information on whether or not the phase data signal is transmitted is not transmitted to the UE.

5. The method of claim 1, wherein when the general data signal corresponds to a signal retransmitted to the UE, a pilot signal is transmitted as the phase data signal.

6. A base station transmitting a signal for estimating phase noise in a communication system using an mmWave band, the base station comprising:
 a transmitter;
 a receiver; and
 a processor connected to the transmitter and the receiver to operate,
 wherein the processor is configured to:
 transmit at least one of information on whether or not a phase data signal is transmitted and information on a modulation order of the phase data signal to a user equipment (UE),
 generate the phase data signal for estimating phase noise from a downlink signal;
 map the phase data signal to a partial region of a resource region that a general data signal to be transmitted to the UE is mapped; and
 transmit the general data signal and the phase data signal to the UE,
 wherein the modulation order of the phase data signal is equal to or lower than a modulation order of the general data signal, and
 wherein based on the modulation order or a Modulation and Coding Scheme (MCS) level of the general data signal satisfying a predetermined condition, the information on whether or not the phase data signal is transmitted is not transmitted to the UE.

7. The base station of claim 6, wherein each of the information on whether or not the phase data signal is transmitted and the information on the modulation order of the phase data signal is transmitted to the UE via Downlink Control Information (DCI), Medium Access Control—Control Element (MAC-CE), or Radio Resource Control (RRC) signaling.

8. The base station of claim 6, wherein when the modulation order or the MCS level of the phase data signal is fixed by a predetermined value, the information on the modulation order of the phase data signal is not transmitted to the UE.

9. The base station of claim 6, wherein when the MCS level of the general data signal is equal to or higher than a specific value, the information on whether or not the phase data signal is transmitted is not transmitted to the UE.

10. The base station of claim 6, wherein when the general data signal corresponds to a signal retransmitted to the UE, a pilot signal is transmitted as the phase data signal.

\* \* \* \* \*